United States Patent [19]
Hutchins et al.

[11] Patent Number: 4,510,684
[45] Date of Patent: Apr. 16, 1985

[54] ROBOT TOOL SYSTEM

[75] Inventors: Burleigh M. Hutchins, Hopkinton; Louis Abrahams, Worcester, both of Mass.

[73] Assignee: Zymark Corporation, Hopkinton, Mass.

[21] Appl. No.: 328,727

[22] Filed: Dec. 8, 1981

[51] Int. Cl.³ .............................................. B23P 11/00
[52] U.S. Cl. ...................................... 29/703; 364/513
[58] Field of Search ................. 29/701, 702, 703, 704; 141/165, 166, 312; 364/513

[56]  References Cited
U.S. PATENT DOCUMENTS

| Re. 28,437 | 6/1975 | DeVol et al. | 364/513 X |
| 4,298,308 | 11/1981 | Richter | 364/513 X |
| 4,379,335 | 4/1983 | Kirsch et al. | 364/513 |

Primary Examiner—Mark Rosenbaum
Assistant Examiner—Timothy V. Eley
Attorney, Agent, or Firm—Andrew F. Kehoe

[57] ABSTRACT

A means for automatically replacing tool means on a robot arm comprising a novel automatically releasable tool means, comprising electrical control conduits communicating with said robot and, in proper circumstance, with a tool rack to signal its position and condition on said rack.

6 Claims, 4 Drawing Figures

4,510,684

ROBOT TOOL SYSTEM

BACKGROUND OF THE INVENTION

It is well known to operate tools by robot means. Most such tools and robots are dedicated to the performance of one kind of operation. However, many areas of art are such that there are manipulative steps, often of short duration, which must be performed to achieve a given result. In these areas, one of which would be the processing of chemicals in a chemical laboratory in which heating, mixing, shaking and centrifugation each might be required within a very few minutes, it has simply been impractical to stop and change tools for each operation. For example, the labor time necessary to recognize need for the tool change and to implement the change would often exceed the value of the robotic action for the procedure to be carried out by a particular tool.

SUMMARY OF THE INVENTION

A principal object of the invention is to provide a readily and automatically-actuatable robot tool system.

Another object of the invention is to provide a light weight tool as described above that has the ability to maintain dependable electrical communication with a robot but also with a tool rack.

Still other objects of the invention are to provide a tool which is smart in the sense that it can (1) report its presence or a condition to a monitor when it is in a racked position and (2) respond to the electrical commands from the robot when it is on the robot's operating arm.

Other objects of the invention will be obvious to those skilled in the art on their reading of this application.

The above objects have been substantially achieved by providing tool assembly apparatus for us in connection with a robot apparatus, the tool comprising (1) a robot connector sub-assembly and (2) a tool assembly connectable to said sub-assembly. The sub-assembly and tool assembly each contain co-operating latch means forming a latched connection between said sub-assembly and tool assembly in response to a unidirectional movement of said robot assembly. Moreover, the robot and said tool assembly comprise connecting electrical connector means and the tool assembly comprises motor means responsive to an electrical control signal through said robot.

In some advantageous modes of the invention, the robot and said tool assembly comprise connecting electrical conduit means and the tool assembly comprises code means forming means to communicate through the robot information specific to identity and condition of the tool means.

In such apparatus, the tool comprises circuit means and connector means to facilitate electrical transmission information relating to the condition of said circuit from the circuit through electrical conduits in the robot connector sub-assembly.

The tool can comprise, additionally, means to transmit information relating to the condition of the circuit to a rack means for the tool.

ILLUSTRATIVE EXAMPLE OF THE INVENTION

In the application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the conditions of a particular case.

FIG. 2 shows the position of the latch when locked on a robot connector assembly.

Figure 1:
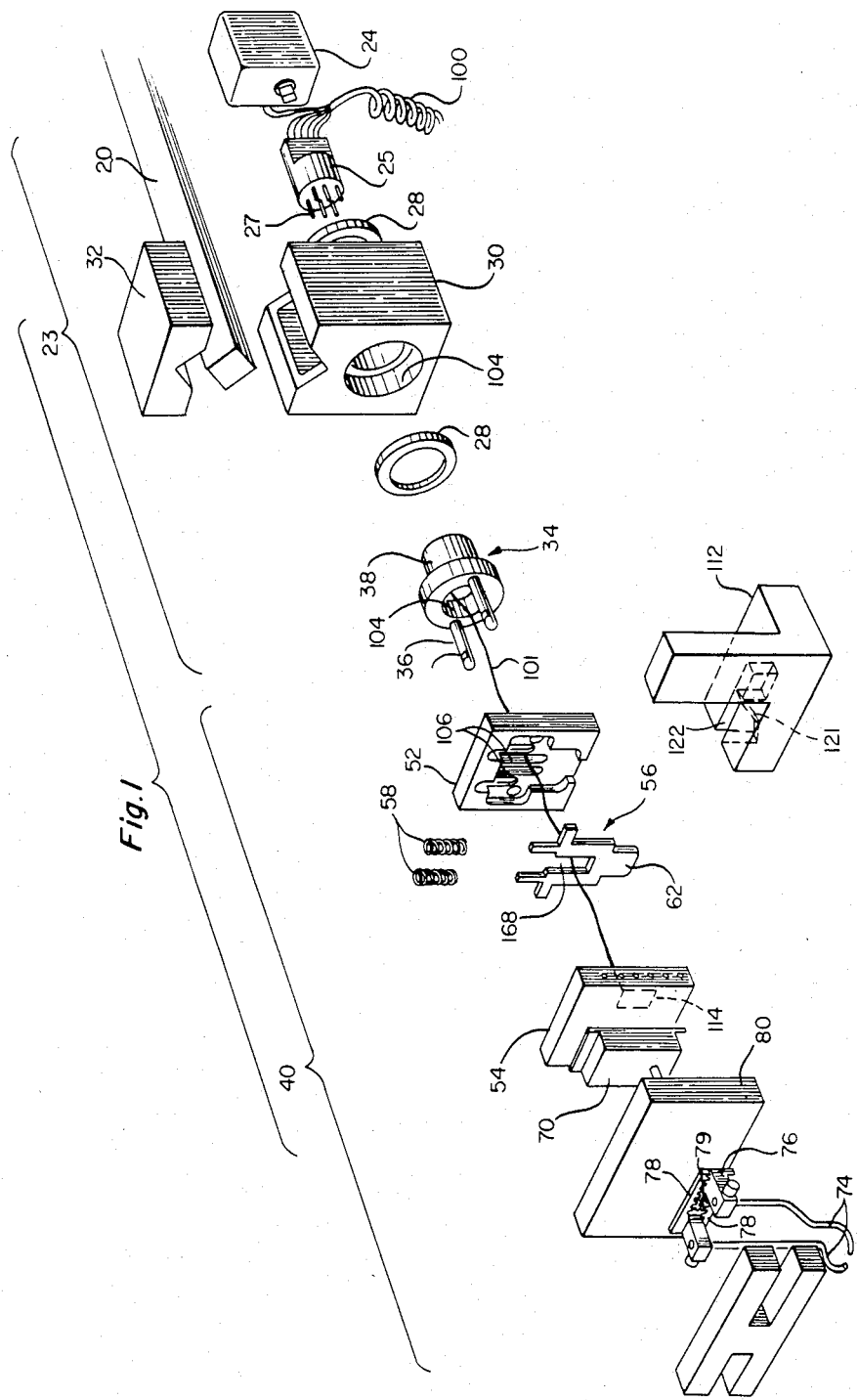
FIG. 1 is an exploded view of one tool assembly/robot/connector combination of the invention.

Referring to FIG. 1, it is seen that an arm 20 of robot apparatus has a robot connector assembly, in this case a wrist assembly, comprising a servo motor 24 for imparting a wrist-like motion to an electrical terminal member, a rotary pin plug 25 carrying a plurality of electrical prongs 27. Member 25 fits snugly with thrust bearing 28 into lower wrist block member 30. Member 30 is clamped to robot arm 20 by upper wrist block member 32 with fasteners, such as screws. (In general, such commonplace fasteners are not shown in these drawings because their presence and use will be known to those skilled in the art.)

The robot connector member 34 of the wrist assembly comprises connector means comprising two tines 36. Connector member 34 comprises a sleeve 38 which also fits into lower wrist block 30 abutting against the face of pin plug terminal 25 and forming means to protect prongs 27 which protrude, when the robot connector assembly is completed, into sleeve 38. It is wrist member 34 which is ultimately rotated within the wrist block formed of members 32 and 30, by servo 34 to provide wrist action. Prongs 36 each comprise a locking groove 26 (see FIGS. 2-3, also) which forms means to lock into the tool assembly.

FIG. 1 also shows a tool assembly 40 which is adapted to be attached to robot connector assembly 23 by a unidirectional thrust of tines 36.

Figures 2, 3:
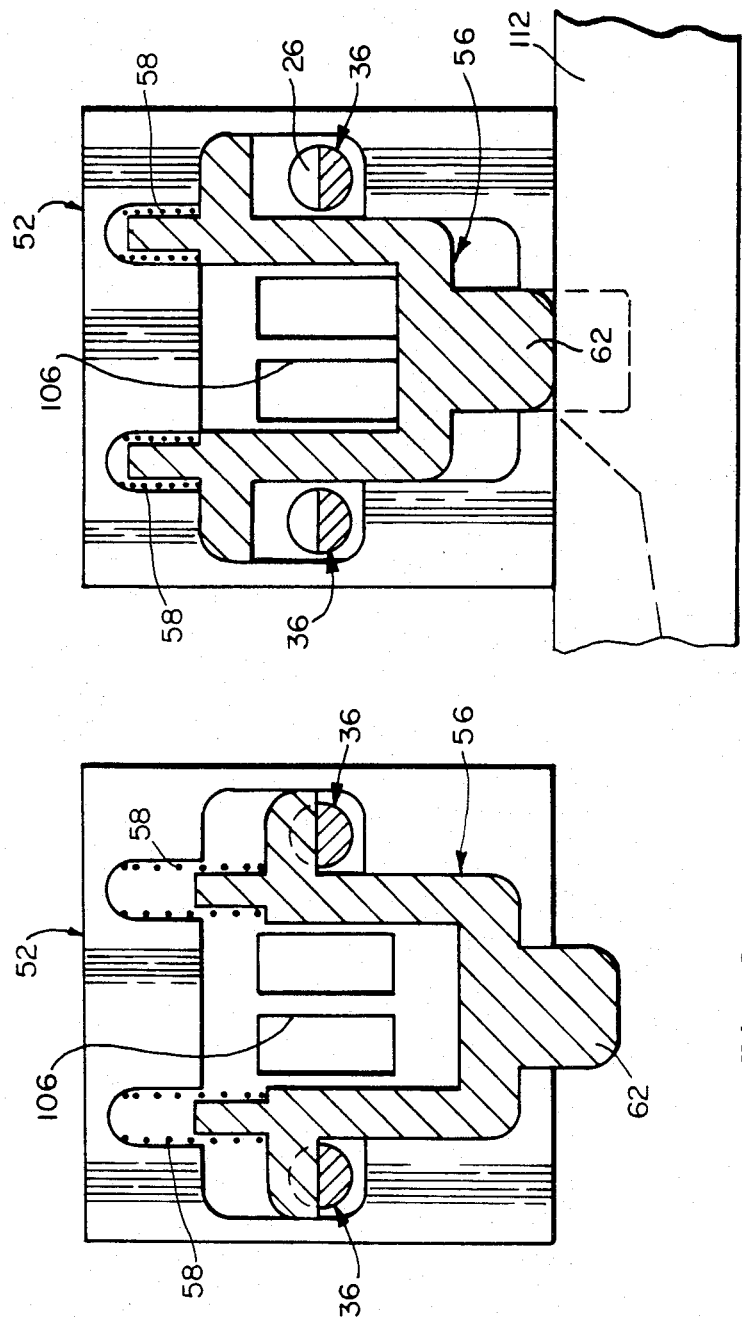
FIGS. 2 and 3 are views in elevation of a latch mechanism used in apparatus of FIG. 1.
Figure 4:
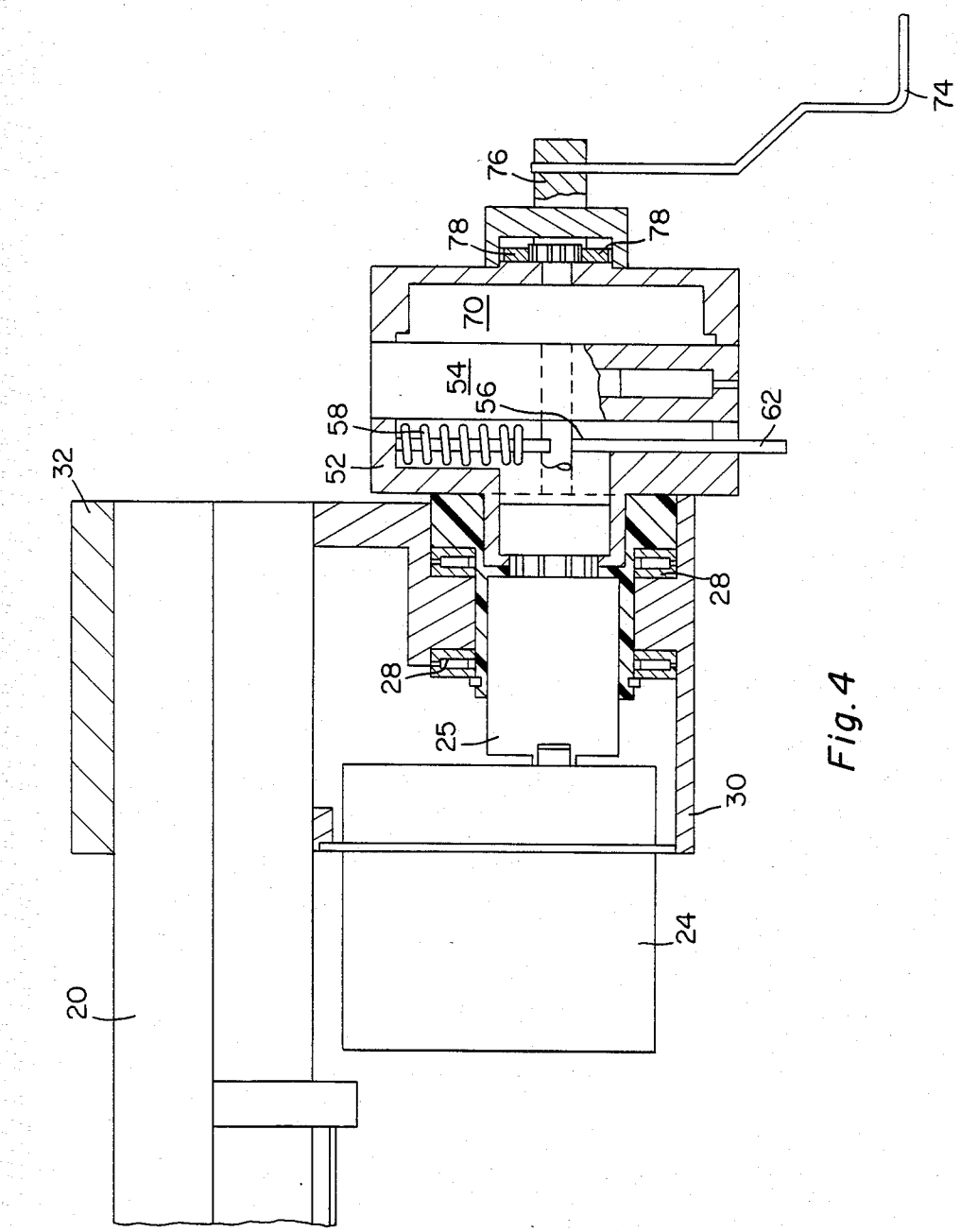
FIG. 4 is a view of the apparatus of FIG. 1 in assembled form.

Tool assembly 40, in this case a device adapted to pick up a test tube, comprises a lock or latching system, which is best seen in FIGS. 2 and 3, and which is held within a latch housing member 52 and a servo mounting terminal plate 54. Latching system comprises a latch member 56 which is held in open (up) position by virtue of the sub-assembly being held in a track on rack 112. A locking bolt 62 is pushed up by engagement with the ramp 121 of the track 122 to maintain this position until prongs 36 enter the apparatus, pull it off sideways and allow the springs to lock the prongs 36 by pushing latch member 56 downwardly into the locking groove 26 of the tines. At this point the robot connector sub-assembly will be firmly clamped onto the tool assembly, the structure of which is completed by a tool servo motor 70 operably connected to a tool or hand 72 comprising a gripping means mounted on brackets 76 which ride back and forth in the gear teeth of upper and lower racks 78 as those racks move in response to rotation of a rotary gear 79 on the servo shaft which rotates through an aperture in tool backplate 80.

It is to be particularly noted however that the tool itself advantageously sits in a tool holder 112 and is secured therein by bolt 62 in its downward position.

Also it is to be noted that, advantageously, the servo motor plate comprises electrical conductor means which provide means to send or receive electrical signals through either the robot or the tool rack depending upon where the tool is at a given time.

Electrical connections from and to the apparatus can be made in a number of convenient ways. However, normally signals will be transmitted and received through multiwire conductor 100 which is connected to rotary pin member 25 and servo 24. Thence connections can be made through a central conduit 104 in the wrist member 34, through slots 106 in lock housing member 52 and opening 108 in latch 56 to servo motor 70. Also, there may be terminals 110 from the terminal mounting to a rack member 112 which, for example, is adapted to read a read only circuit, conveniently a memory chip 114, within the member 54 giving information about the tool members condition. In the simplest case the chip or circuit can carry a message as simple as "I am here on the rack" or "I am here locked properly on the robot". Such simple switching and coding is well within the skill of those in the art. In fact, with ROM chips, it is also convenient to communicate information relating to other conditions including whether the device has been cleaned, whether it is wet or dry, hot or cold, etc. Very light servo motors, typically those used in model aircraft such as those sold by Kraft Systems, Inc. under the trade designation KPS-12 and KPS-16, are useful in many of the applications of the present invention, including in the illustrated embodiment of the invention.

It is also to be understood that the following claims are intended to cover all of the generic and specific features of the invention herein described and all statements of the scope of the invention which might be said to fall therebetween.

What is claimed is:

1. A tool assembly apparatus for use in connection with a robot, said tool comprising (1) a robot connector subassembly permanently attached to an arm of said robot and (2) a tool; said tool assembly comprising means to automatically connect and disconnect, both mechanically and electrically, said tool from said permanently attached subassembly in response to relative movement of said tool and said robot arm, and code means positioned on said tool to communicate information specific to its identity and condition from said tool, through said robot.

2. Apparatus as defined in claim 1, wherein said robot and said tool assembly comprise connecting electrical connector means and wherein said tool assembly comprises motor means responsive to an electrical control signal through said robot.

3. Apparatus as defined in claim 1 wherein said robot and said tool assembly comprise connecting electrical conduit means and wherein said tool assembly comprises code means forming means to communicate through said robot information specific to identity and condition of said tool means.

4. Apparatus as defined in claim 1 wherein said code means is a read-only-memory device.

5. Apparatus as defined in claims 1,2, 3 or 4 wherein said tool comprises circuit means and connector means to facilitate electrical transmission information relating to the condition of said circuit from said circuit through electrical conduits in said robot connector subassembly.

6. Apparatus as defined in claim 5 wherein said tool comprises, additionally, connector means to transmit information relating to the condition of said circuit to a rack means for said tool.

* * * * *